(12) United States Patent
Fujiwara et al.

(10) Patent No.: US 7,425,042 B2
(45) Date of Patent: Sep. 16, 2008

(54) ELECTRIC OPERATING APPARATUS FOR VEHICLE

(75) Inventors: Noboru Fujiwara, Toyota (JP); Takashi Hayashihara, Toyota (JP); Hiroshi Isono, Toyota (JP)

(73) Assignee: Toyoda Iron Works Co., Ltd., Toyota-shi Aichi-ken (JP)

( * ) Notice: Subject to any disclaimer, the term of this patent is extended or adjusted under 35 U.S.C. 154(b) by 298 days.

(21) Appl. No.: 10/839,137

(22) Filed: May 6, 2004

(65) Prior Publication Data

US 2005/0235820 A1    Oct. 27, 2005

(30) Foreign Application Priority Data

Apr. 26, 2004 (JP) ............................... 2004-130381

(51) Int. Cl.
*B60K 31/00* (2006.01)
(52) U.S. Cl. .................................................. 303/114.1
(58) Field of Classification Search ............. 303/114.1, 303/115.2; 188/151 R, 355–358
See application file for complete search history.

(56) References Cited

U.S. PATENT DOCUMENTS

| 5,771,773 | A | 6/1998 | Sakamoto et al. |
| 6,149,247 | A | 11/2000 | Hofmann et al. |
| 6,309,032 | B1 | 10/2001 | Kusano et al. |
| 6,476,515 | B1 * | 11/2002 | Yamamoto et al. ......... 307/10.1 |
| 6,811,229 | B2 * | 11/2004 | Soga ........................ 303/152 |
| 6,877,821 | B2 * | 4/2005 | Yokoyama et al. ....... 303/115.2 |
| 2003/0160504 | A1 | 8/2003 | Chris |

FOREIGN PATENT DOCUMENTS

| DE | 198 32 036 A1 | 1/1999 |
| DE | 102 05 037 A1 | 8/2003 |
| EP | 0 768 224 A1 | 4/1997 |
| JP | 05-262210 | 10/1993 |
| JP | 07-10750 | 2/1995 |

(Continued)

OTHER PUBLICATIONS

Translation of paragraphs [0095] though [107] and Figs 1, 13, and 14 of Japanese Patent Publication No. JP 2002-308084.

*Primary Examiner*—Christopher P. Schwartz
(74) *Attorney, Agent, or Firm*—Finnegan, Henderson, Farabow, Garrett & Dunner, L.L.P.

(57) ABSTRACT

An electric operating apparatus for a vehicle including an operational member operated in accordance with a traveling request or a braking request of a driver; and a reaction force adjuster that can electrically adjust a reaction force of the operational member; and wherein a driving force or a braking force is electrically controlled in accordance with a requested operation applied to the operational member against the reaction force; comprises (a) an operational information detecting device for detecting operational information concerning a requested operation applied to the operational member by the driver; (b) an environmental information detecting device for detecting environmental information concerning a driving environment of the vehicle; (c) a target pattern setting means for setting a target pattern concerning the requested operation based on the environmental information; and (d) a driving support means for controlling the reaction force adjusted by the reaction force adjuster based on the operational information so that the requested operation is performed in accordance with the target pattern.

14 Claims, 13 Drawing Sheets

FOREIGN PATENT DOCUMENTS

| | | |
|---|---|---|
| JP | 08-150263 | 6/1996 |
| JP | 11-078595 | 3/1999 |
| JP | 11-78595 | 3/1999 |
| JP | 2000-168532 | 6/2000 |
| JP | 2000-507188 | 6/2000 |
| JP | 2001-063554 | 3/2001 |
| JP | 2001-130396 | 5/2001 |
| JP | 2001-138882 | 5/2001 |
| JP | 2001-247020 | 9/2001 |
| JP | 2001-301591 | 10/2001 |
| JP | 2001-334919 | 12/2001 |
| JP | 2002-517352 | 6/2002 |
| JP | 2002-208084 | 10/2002 |
| JP | 2002-308084 | 10/2002 |
| JP | 2002-323930 | 11/2002 |
| JP | 2003-127846 | 5/2003 |
| JP | 2003-252188 | 9/2003 |
| JP | 2003-261015 | 9/2003 |
| JP | 2003-312457 | 11/2003 |
| JP | 2003-312458 | 11/2003 |

* cited by examiner (a)

| | Input | | | Braking force | Reaction force (rigidity) F | Hysteresis |
|---|---|---|---|---|---|---|
| | Depressing force $F_P$ | Stroke S | Depressing acceleration | | | |
| When traveling normally | ↑ | ↑ | ↑ | ↑ | ↑ | |
| Collision | ↖ | ↗ | ↖ | ↗ | ↖ | |
| Emergency | ↖ | ↗ | ↖ | ↗ | ↖ | |
| Breakdown | ↖ | ↗ | ↖ | ↗ | ↖ | |
| Fatigue | ↗ | ↑ | ↗ | ↖ | ↗ | ↖ |
| High speed | ↖ | ↗ | ↖ | ↖ | ↑ | |
| Low speed | ↗ | ↑ | ↗ | ↑ | ↗ | ↑ |
| Traffic snarl | ↗ | ↑ | ↗ | ↖ | ↗ | ↖ |
| Mountain road (ascending) | ↖ | ↗ | ↖ | ↖ | ↗ | |
| Mountain road (descending) | ↖ | ↗ | ↖ | ↖ | ↖ | ↗ |

FIG. 18

| | Motor 42 | Damper 26 | Load sensor 50 | Load sensor 52 | Stroke sensor 54 | Reaction force F | Hysteresis | Brake control |
|---|---|---|---|---|---|---|---|---|
| One breakdown | × | O | O | O | O | O※1 | O | O |
| | O | × | O | O | O | O | × | O |
| | O | O | × | O | O | O | O | O |
| | O | O | O | O | × | O | O | O |
| Two breakdowns | × | × | O | O | O | O※1 | × | O |
| | × | O | × | O | O | O※1 | O | O |
| | × | O | O | O | × | O※1 | O | O |
| | O | × | × | O | O | O | × | O |
| | O | × | O | × | × | O | × | O |
| | O | O | × | O | × | O | O | O※2 |
| | O | O | O | × | × | O | O | O |
| Three breakdowns | × | × | × | O | O | O※1 | × | O |
| | × | × | O | × | × | O※1 | × | O |
| | × | O | × | × | O | O※1 | O | O※2 |
| | O | O | × | O | × | O | O | O※2 |
| | O | × | × | × | × | O | × | O |
| | O | O | × | × | × | × | O | × |

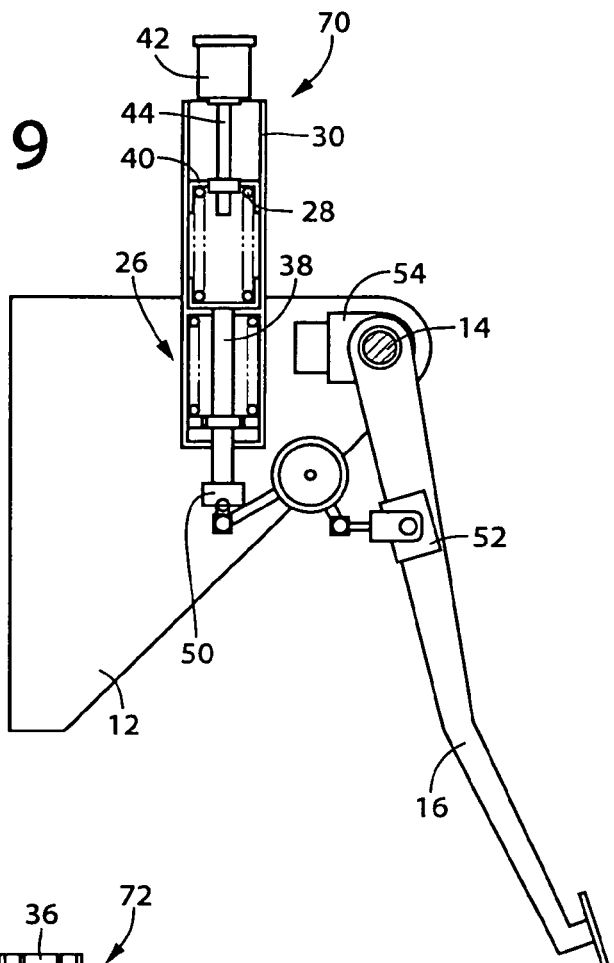

ELECTRIC OPERATING APPARATUS FOR VEHICLE

This application is based on Japanese Patent Application No. 2004-130381 filed Apr. 26, 2004, the contents of which are incorporated hereinto by reference.

BACKGROUND OF THE INVENTION

1. Field of the Invention

This invention relates to an electric operating apparatus for a vehicle, and more particularly to an electric operating apparatus for a vehicle in which a requested operation, such as a braking operation, is performed in accordance with a target pattern.

2. Discussion of Related Art

An electric operating apparatus for a vehicle in which a hydraulic power unit, an electric motor, etc., are operated in a predetermined manner by electrically detecting the depressing stroke of an operation pedal has been proposed, for example, in a service brake pedal apparatus used in a vehicle. The thus structured electric operating apparatus has a conventional problem in the fact that a driver accustomed to a conventional mechanical operating apparatus has difficulty in depressing a pedal because a depression reaction force is hardly generated by depressing the pedal although a reaction force is generated and applied by a return spring. Therefore, Patent Document 1 proposes a pedal reaction force apparatus in which a nonlinear depression reaction force that has hysteresis is given by use of a plurality of spring members and a damper, and Patent Document 2 proposes a technique according to which a variable pattern of a depression reaction force is changed by giving a pedal reaction force with a spring member and detecting an operating state, such as depressing speed electrically then moving the position of a spring bearing with an electric motor or the like.

[Patent Document 1] JP 2003-261015
[Patent Document 2] JP 2002-308084

However, in these conventional reaction force apparatuses, a reaction force is merely changed in accordance with a situation in which an operational member is operated, for example, in accordance with depressing speed, and no consideration is given to driving environments, such as road conditions, weather conditions, vehicular traveling speed conditions, and vehicle conditions, excluding a braking operation. Therefore, it is difficult to say that an appropriate braking force can always be obtained under various driving environments, and there is still room for improvement in allowing an easy operation so that even an inexperienced driver can always obtain an appropriate braking force. This problem exists not only in an electric braking operation apparatus but also in an electric operating apparatus, such as an accelerator pedal, for traveling requirements.

The present invention has been made in consideration of the foregoing circumstances, and it is an object of the present invention to provide an electric operating apparatus for a vehicle that can be easily operated so as to obtain an appropriate driving force and an appropriate braking force in various driving environments.

SUMMARY OF THE INVENTION

In order to achieve the object, an electric operating apparatus for a vehicle according to a first aspect of the present invention includes (a) an operational member operated in accordance with a traveling request or a braking request of a driver; and (b) a reaction force adjuster that can electrically adjust a reaction force of the operational member; wherein (c) a driving force or a braking force is electrically controlled in accordance with a requested operation applied to the operational member against the reaction force; and the electric operating apparatus is characterized by comprising: (d) an operational information detecting device for detecting operational information concerning a requested operation applied to the operational member by the driver; (e) an environmental information detecting device for detecting environmental information concerning a driving environment of the vehicle; (f) a target pattern setting means for setting a target pattern concerning the requested operation based on the environmental information; and (g) a driving support means for controlling the reaction force adjusted by the reaction force adjuster based on the operational information so that the requested operation is performed in accordance with the target pattern.

A second aspect of the present invention is characterized in that, in the electric operating apparatus for a vehicle according to the first aspect of the present invention, (a) the operational member is a brake operating member that is operated in accordance with a braking request of the driver, and (b) the requested operation is a braking operation applied to the brake operating member in accordance with the braking request.

A third aspect of the present invention is characterized in that, in the electric operating apparatus for a vehicle according to the second aspect of the present invention, the reaction force adjuster comprises: (a) a damper device that gives the reaction force based on flow resistance of a fluid by being mechanically compressed or pulled in response to the braking operation; (b) a spring member that gives the reaction force based on elastic deformation by being mechanically subjected to the elastic deformation in response to the braking operation; and (c) an electric drive unit that adjusts the reaction force generated based on the elastic deformation of the spring member by electrically moving a position of a spring bearing of the spring member.

A fourth aspect of the present invention is characterized in that, in the electric operating apparatus for a vehicle according to the second or third aspect of the present invention, (a) the operational information detecting device comprises: an operating force sensor that detects an operating force applied to the brake operating member; and a stroke sensor that detects an operation stroke of the brake operating member, wherein (b) the target pattern is set by use of a predetermined parameter obtained from the operating force and the operation stroke, and (c) the driving support means controls the reaction force so that the predetermined parameter varies in accordance with the target pattern.

A fifth aspect of the present invention is characterized in that, in the electric operating apparatus for a vehicle according to the fourth aspect of the present invention, the operating force sensor provided therein is two in number.

A sixth aspect of the present invention is characterized in that, in the electric operating apparatus for a vehicle according to any one of the first to fifth aspects of the present invention, the environmental information contains information concerning at least road conditions, weather conditions, vehicular traveling speed conditions, and vehicle conditions, and the target pattern is set based on information concerning the road conditions, the weather conditions, the vehicular traveling speed conditions, and the vehicle conditions.

According to the thus structured electric operating apparatus for a vehicle, operational information concerning a requested operation of a driver and environmental information concerning a driving environment of a vehicle are detected, and a target pattern concerning the requested operation is set based on the environmental information, and a reaction force is controlled based on the operational information so that the requested operation is performed in accordance with the target pattern. Therefore, the requested operation can be easily performed in accordance with each target pattern in various driving environments, and a suitable (e.g., ideal) driving force or braking force corresponding to the target pattern is controlled in accordance with the requested operation, so that an excellent driving feeling can be easily obtained in various driving environments.

The second aspect of the present invention is concerned with an electric service brake operating apparatus, and a reaction force is controlled based on operational information so that a braking operation is performed in accordance with a target pattern. Therefore, the braking operation can be easily performed in accordance with the target pattern in various driving environments, and a suitable braking force corresponding to the target pattern is controlled in accordance with the braking operation.

According to the third aspect of the present invention, the reaction force adjuster includes a damper device that gives a reaction force based on the flow resistance of a fluid and a spring member that gives a reaction force based on elastic deformation. The reaction force is mechanically given by the damper device and the spring member. The reaction force given by the damper device depends on the operating speed of the braking operation. When a quick operation is performed, a reaction force greater than when a slow operation is performed is mechanically given, and hysteresis in which the reaction force differs between that during a braking operation and that during a return operation is mechanically given. Therefore, reaction force characteristics similar to those of a conventional mechanical brake operating apparatus can be easily obtained even when a operating speed is different in each operation when a return operation is performed.

The reaction force adjuster according to the third aspect of the present invention is structured so that a reaction force generated based on the elastic deformation of the spring member is adjusted by electrically moving the position of the spring bearing of the spring member by means of the electric drive unit. Therefore, the reaction force can be finely controlled so that the braking operation is performed in accordance with the target pattern set in accordance with various driving environments, and a more appropriate reaction force than in a conventional mechanical brake operating apparatus can be obtained so as to facilitate the braking operation. The maximum operation stroke of the brake operating member can also be changed by changing the position of the spring bearing.

According to the fourth aspect of the present invention, an operating force and an operation stroke are detected by the operating force sensor and the stroke sensor, and a reaction force is controlled so that a predetermined parameter obtained from the operating force and from the operation stroke varies in accordance with the target pattern. Therefore, a braking operation to obtain an appropriate braking force can be easily performed.

According to the fifth aspect of the present invention, two operating force sensors are provided. Therefore, a usual brake control operation can be performed by use of one of the operating force sensors even if the other operating force sensor breaks down. Additionally, a brake control operation can be performed based on an operation stroke detected by the stroke sensor even if both of the operating force sensors breakdown, and a high fail safe function is obtained.

According to the sixth aspect of the present invention, information concerning at least road conditions, weather conditions, vehicular traveling speed conditions, and vehicle conditions is detected as environmental information, and a target pattern is set based on this information concerning road conditions, weather conditions, vehicular traveling speed conditions, and vehicle conditions. Therefore, a requested operation by which a driving force or a braking force is suitably controlled can be easily performed in various driving environments.

The electric operating apparatus for a vehicle of the present invention is suitably applied to a service brake operating apparatus having an operation pedal used as an operational member, and is applicable to a brake operating apparatus having operational members other than the operation pedal or to an accelerator operating apparatus that performs a traveling request. A foot-operated pedal that is rotated around a supporting shaft by being depressed by foot is suitably used as the operational member, and another type of operational member, such as a hand-operated member, a slide type operation member, or a fixed-position pressing operation member, can be employed as the operational member.

For example, a driving force and a braking force controlled in accordance with a requested operation applied to the operational member can be controlled based on an operation stroke, or can be controlled based on an operating force, or can be controlled in consideration of both of the operation stroke and the operating force, or can be controlled by proper use under any conditions. The driving force and the braking force can be controlled in consideration of the operating speed obtained by differentiating an operation stroke, the rate of change of an operating force, the workload D obtained by multiplying the operation stroke and the operating force together, or the rate of work obtained by multiplying the operation force and the operating speed together.

Operational information concerning a requested operation is the aforementioned operation stroke, the operating force, the operating speed, the rate of change of the operating force, the workload D, or the rate of work. Fundamentally, the operation stroke and the operating force can be obtained by detecting and the other factors can be obtained by calculating. Preferably, the operation stroke and the operating force are an operation stroke and an operating force of the operational member. However, it is permissible to detect a movement stroke of another member displaced in response to a movement of the operational member or a pressing load of another part that varies in accordance with the operating force.

In the fourth aspect of the present invention, the operation stroke and the operating force are detected, but, in another aspect of the present invention, the driving support means can perform a driving support control operation by detecting either the operation stroke or the operating force. Therefore, various forms can be employed. For example, a target pattern is set, with the operating force as a parameter, so as to control the reaction force. It is to be noted that the operating force and the reaction force have the action-and-reaction relationship, and, basically, they are opposite in direction and are the same in magnitude.

The target pattern is determined so that an ideal driving force and an ideal braking force can be obtained, for example, in various driving environments. The braking force is determined so that a braking operation that enables a smooth deceleration and a smooth stop can be performed, for example, even for an inexperienced driver who might depress the operation pedal twice because of a long braking distance, bring about irregularity in the operating force and in the operating speed, or re-accelerate the vehicle because of a short braking distance. Additionally, when a series of variable patterns of the operational member from the operation start to the release of the operation, for example, is set as the target pattern with time as parameter, various forms can be employed. For example, a series of variable patterns can be set by being divided into the duration of an input operation such as the depressing operation, the duration of a steady operation, and the duration of a return operation to release the operation.

For example, workload D, which is the product of the operating force and the operation stroke, is used as the predetermined parameter according to the fourth aspect of the present invention, and a reaction force is controlled so that the actual workload D varies in accordance with a target pattern. However, it is possible to use another parameter obtained by using the operation stroke and the operating force, such as rate of work that is the product of the rate of change (i.e., operating speed) of the operation stroke and the operating force.

In the fourth aspect of the present invention, a target pattern is set with, for example, the workload D obtained by using both the operating force and the operation stroke as a parameter. However, in another aspect of the present invention, it is permissible to set a target pattern, for example, with the operation stroke as a parameter, and to control a reaction force so that an actual operation stroke varies in accordance with this target pattern, and to control a driving force or a braking force in accordance with this operation stroke.

In the fourth aspect of the present invention, a reaction force is controlled so that a predetermined parameter (e.g., workload D) varies in accordance with a target pattern. Therefore, preferably, a braking force is also controlled in accordance with the aforementioned predetermined parameter (e.g., workload D) that varies in accordance with the target pattern. However, it is also possible to control the driving force or the braking force by use of a parameter different from the target pattern.

It is preferable to construct the reaction force adjuster to have a damper device, a spring member, and an electric drive unit as shown in the third aspect of the present invention. However, what is required of the reaction force adjuster at least is to have the capability to give a reaction force to an operational member and the capability to electrically adjust the reaction force. Therefore, various forms can be employed. For example, the reaction force adjuster may have only the spring member and the electric drive unit, or only an electromagnetic apparatus that gives a reaction force by means of an electromagnetic force may be employed. The electric drive unit that changes the position of the spring bearing of the spring member can employ various forms. For example, the electric drive unit may be structured so as to linearly reciprocate the position of the spring bearing while rotating a feed screw by means of an electric motor, or so as to reciprocate the position of the spring bearing while rotating a cam by means of the electric motor.

The damper device is to give a depression reaction force by the flow resistance of a fluid flowing through an orifice or the like, and a gas-type damper device that is filled with gas, such as air, as the fluid is suitably used. A damper device filled with a liquid, such as operating oil, or with another fluid may be employed. A check valve which blocks the flow of the fluid when the operational member is input and permits the flow of the fluid when the operational member is returned can be provided, so that large flow resistance is generated by the orifice or the like when the operational member is depressed, and small flow resistance is generated so that the operational member can be quickly returned to its original position by the spring member or the like when the operational member is returned.

A helical compression spring or a helical extension spring is suitably used as the spring member. However, another spring member, such as a torsion coil spring, can be used. A gas-pressure type spring member, such as an air spring, can also be used. This spring member may be used also as a return spring, and may be disposed independently of the return spring.

For example, based on the magnitude of a deviation between a target pattern and operational information (e.g., workload D), the driving support means is structured so as to subject the reaction force to feedback control so that the deviation becomes equal to zero (0). However, various forms can be employed. For example, the reaction force is increased or decreased by a fixed quantity in accordance with ± of the deviation.

The third to fifth aspects of the present invention are concerned with the electric service brake operating apparatus. However, an electric accelerator operating apparatus in which an operational member is operated in accordance with a traveling request can employ the same structure.

Environmental information concerning the driving environment of a vehicle contains all information except a requested operation to the operational member of a driver which includes information concerning driving operations other than the operation of the operational member of the present invention, such as a steering wheel operation or a shift lever operation, and information concerning the physical condition of the driver (e.g., ventricular rate, body temperature, fatigue). In the sixth aspect of the present invention, information concerning at least road conditions, weather conditions, vehicular traveling speed conditions, and vehicle conditions is detected. However, in another aspect of the present invention, a target pattern can be set by detecting a part of these conditions.

BRIEF DESCRIPTION OF THE DRAWINGS

FIG. 11 is a table for explaining the content of a process that is performed when a target pattern is set in accordance with various environmental information in step S2 of FIG. 9.

FIG. 18 is a table for explaining a fail safe function of the embodiment of FIG. 1.

FIG. 19 is a schematic block diagram explaining another embodiment of the present invention, which corresponds to FIG. 1(a).

FIG. 20 is a schematic block diagram explaining still another embodiment of the present invention, which corresponds to FIG. 1(a).

DETAILED DESCRIPTION OF THE PREFERRED EMBODIMENTS

Embodiments

Figure 1:
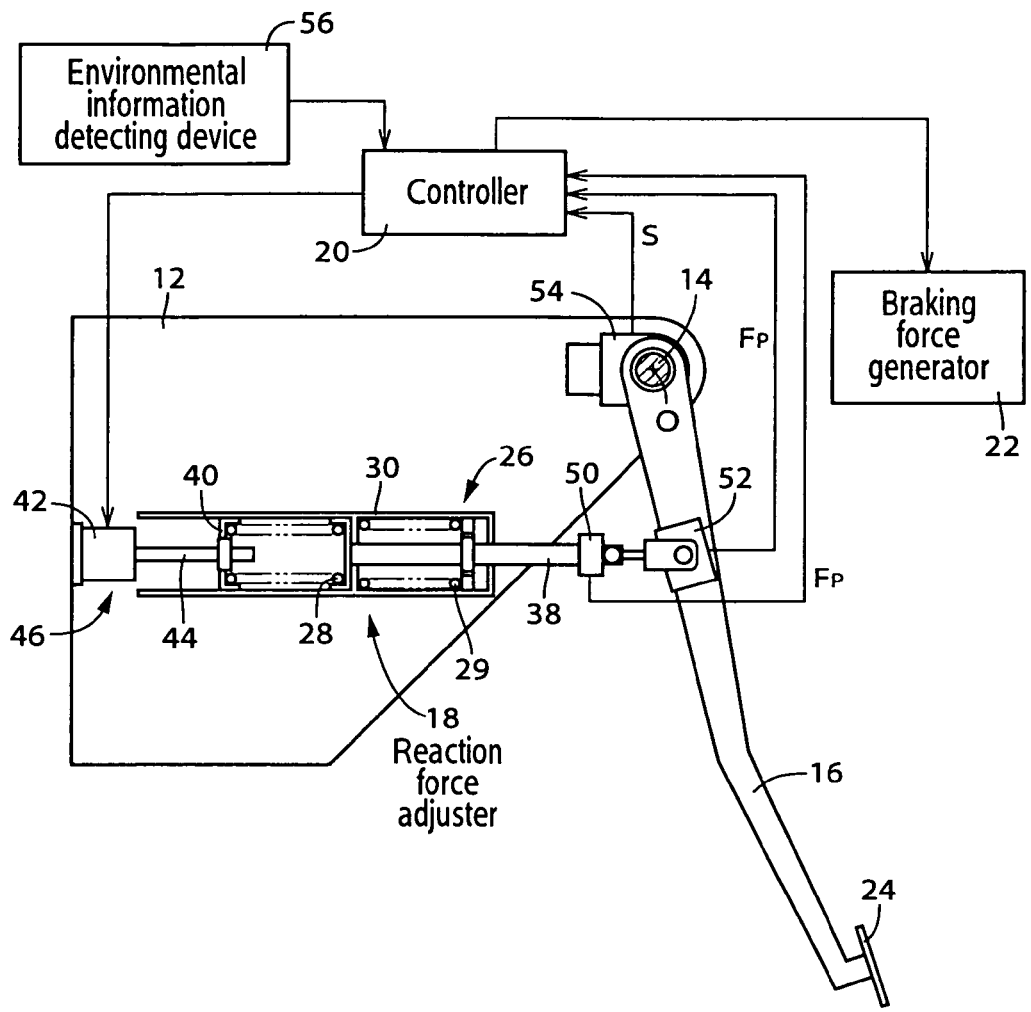
FIG. 1 explains an example of an electric service brake operating apparatus for a vehicle to which the present invention is applied, in which (a) is a schematic block flow diagram thereof, and (b) is an enlarged sectional view of a damper portion.
Figure 1:
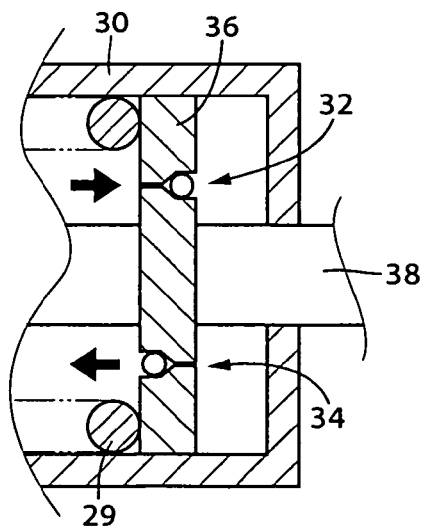
Figure 2:
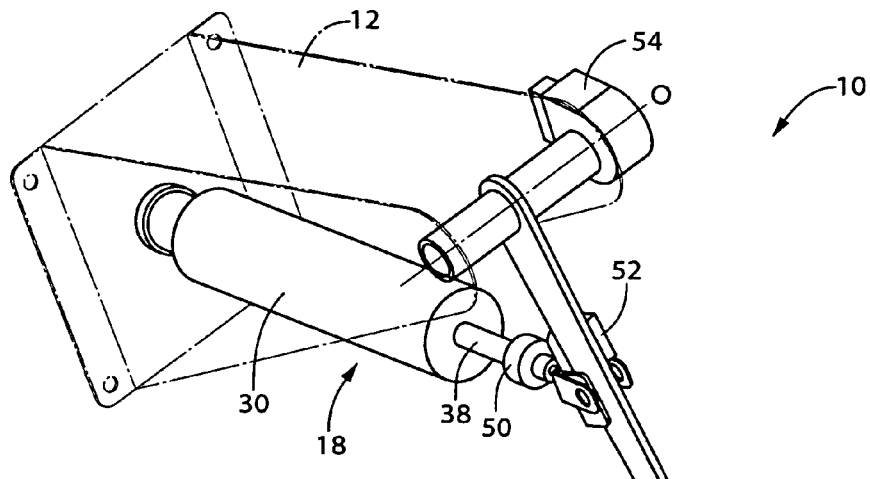
FIG. 2 is a perspective view showing a main part of the embodiment of FIG. 1.
Figure 3:
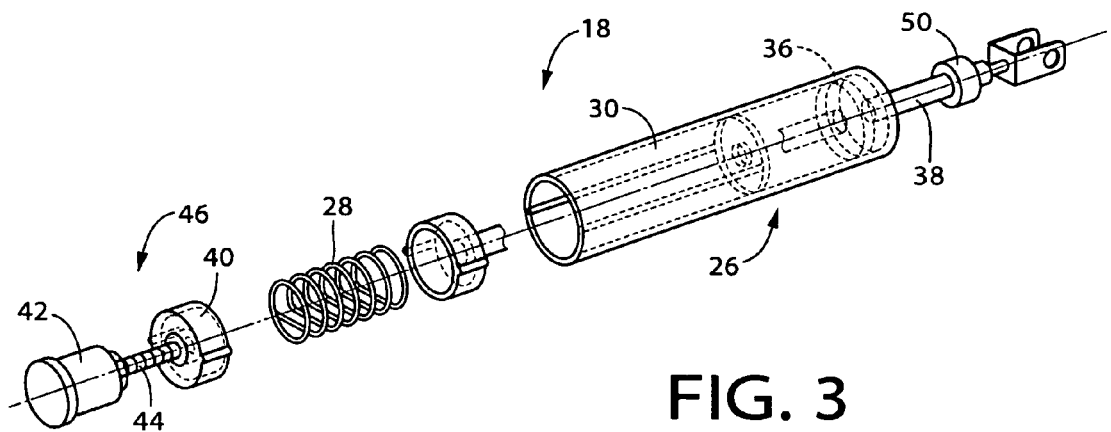
FIG. 3 is an exploded perspective view of a reaction force adjuster of the embodiment of FIG. 1.
Figure 4:
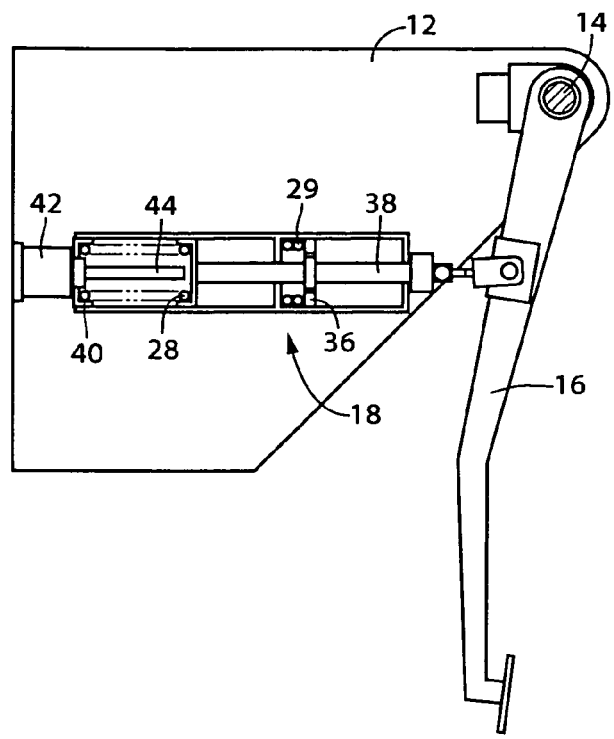
FIG. 4 shows states in which an operation pedal is depressed in the embodiment of FIG. 1, in which (a) shows a state of adjusting a reaction force so as to become small, and (b) shows a state of adjusting a reaction force so as to become great.
Figure 4:
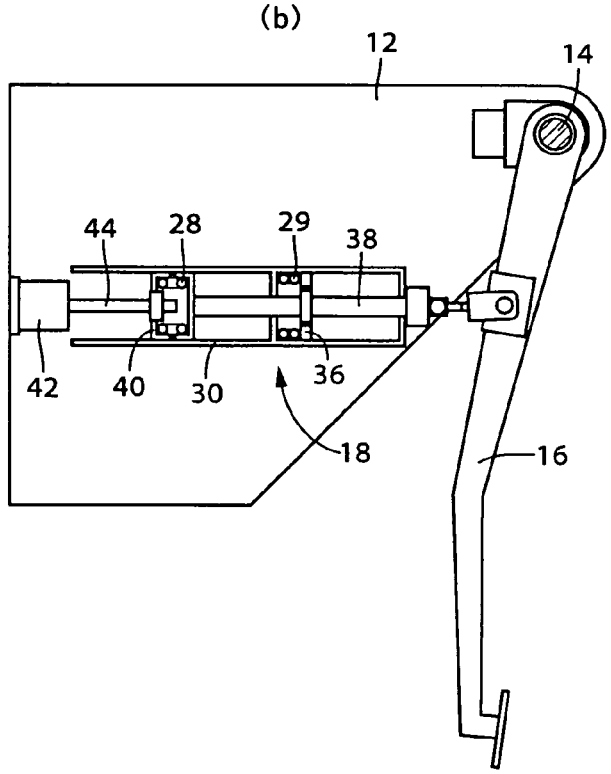

Embodiments of the present invention will be hereinafter described in detail with reference to the drawings. FIG. 1 shows an electric service brake operating apparatus 10 for a vehicle (hereinafter, referred to simply as "brake operating apparatus 10"), which is an embodiment of the present invention. FIG. 1(a) is a schematic block flow diagram of the apparatus whose part is sectionally shown, and FIG. 1(b) thereof is a sectional view of a damper portion. The brake operating apparatus 10 includes an operation pedal 16 rotatably disposed around an axis center O of a substantially horizontal supporting shaft 14 provided in a bracket 12 fixedly integral with a vehicle body, a reaction force adjuster 18, a controller 20, and a braking force generator 22. The operation pedal 16 is a brake operating member that is depressed by a driver in accordance with a braking request. A depression part (pad) 24 is provided at the lower end of the operation pedal 16. FIG. 2 is a perspective view showing the main part of the brake operating apparatus 10, and FIG. 3 is an exploded perspective view of the reaction force adjuster 18. Although the reaction force adjuster 18 of FIG. 1(a) is shown as a section, hatching (i.e., oblique lines in the sectional part) is omitted. The same applies to FIG. 4, FIG. 19, and FIG. 20.

The reaction force adjuster 18 can give a reaction force F to the operation pedal 16 and can electrically adjust the reaction force F. The reaction force adjuster 18 includes a damper device 26 linearly disposed between the operation pedal 16 and the bracket 12, a pair of helical compression springs 28 and 29, and an electric drive unit 46. The damper device 26 includes a cylinder 30 fixed to the bracket 12, a piston 36 that is slidably fitted in the cylinder 30 and that has a pair of check-valve-provided orifices 32 and 34, and a piston rod 38 that is formed integrally with the piston 36 and that is connected to the operation pedal 16. The piston rod 38 is mechanically pushed into the cylinder 30 so as to create a compressed state in response to the depressing operation, that is, the braking operation of the operation pedal 16, and the piston 36 is moved in the cylinder 30, whereby a reaction force is generated, based on the flow resistance of a fluid (air in this embodiment) flowing through the orifice 32. This reaction force becomes larger proportionately with the moving speed of the piston 36, that is, the depressing speed of the operation pedal 16. While the operation pedal 16 is being subjected to a return operation, that is, while the operation pedal 16 is returning to an original position by means of the piston rod 38 in accordance with the biasing force of the helical compression springs 28 and 29 because of a decrease in a depressing force $F_p$ that is a depressing operating force, the reaction force is reduced by the flow resistance of the fluid flowing through the other orifice 34, and hysteresis by which the reaction force becomes smaller than during the depressing operation is given. However, the orifice 34 is larger in the flowing sectional area and is smaller in the flow resistance than the orifice 32, so that the operation pedal 16 can quickly return to the original position.

The helical compression springs 28 and 29 are each equivalent to a spring member. The helical compression spring 28 is disposed between the piston rod 38 and a spring bearing 40, and the helical compression spring 29 is disposed between the piston 36 and the cylinder 30. Either of these springs is mechanically compressed and is elastically deformed in response to the depressing operation of the operation pedal 16, and, based on the elastic deformation, a reaction force is given to the operation pedal 16. The spring bearing 40 is engaged through a ball nut to a feed screw 44 that is normally and reversely rotated and driven by an electric motor 42. The position of the spring bearing 40 is moved by the rotation of the feed screw 44, whereby a reaction force generated based on the elastic deformation of the helical compression spring 28 is adjusted. In other words, each of FIG. 4(a) and FIG. 4(b) shows a state in which the operation pedal 16 is being depressed, and FIG. 4(a) thereof shows a state in which the spring bearing 40 is retracted to its maximum so that the reaction force F becomes smallest, whereas FIG. 4(b) thereof shows a state in which the spring bearing 40 is advanced to its maximum so that the helical compression spring 28 is subjected to the greatest elastic compression and deformation and so that the reaction force F becomes greatest. The electric drive unit 46 includes the electric motor 42 and the feed screw 44, and electrically adjusts the reaction force F. The electric motor 42 is controlled by a controller 20. In order to position the spring bearing 40 at a predetermined location, the phase of the feed screw 44 may be positioned while always applying an electric current to the electric motor 42, but, in this embodiment, the lead, or the like, of the feed screw 44 is determined so that the feed screw 44 is not rotated by the urging force of the helical compression spring 28 and so that the spring bearing 40 does not move even if no electric current is applied to the electric motor 42.

Figure 5:
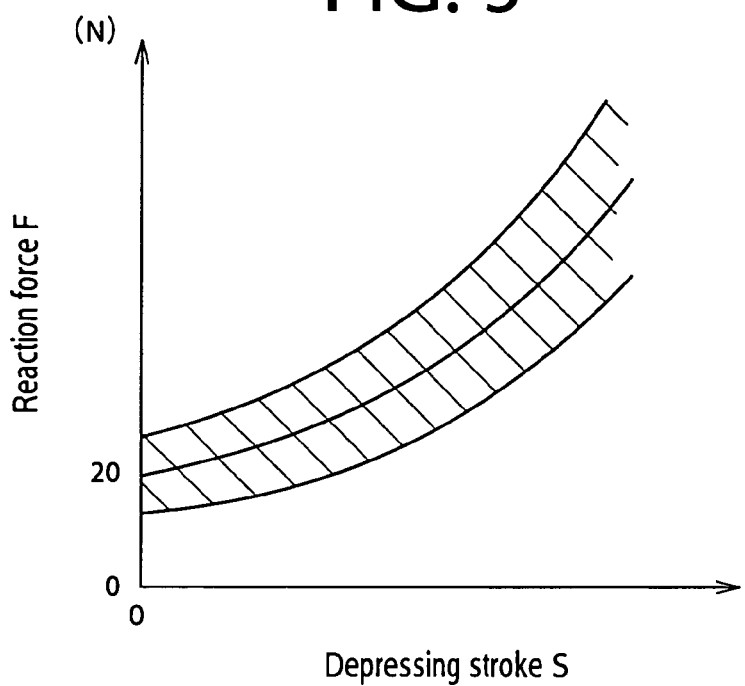
FIG. 5 is a graph showing an example of the relationship between a reaction force F and a depressing stroke S generated by the reaction force adjuster of the embodiment of FIG. 1.

FIG. 5 is a graph showing the relationship between a depressing stroke (operation stroke) S of the reaction force adjuster 18 and a reaction force F. An initial reaction force F in a state in which the depressing stroke S is 0, that is, in which the operation pedal 16 is placed at an original position is appropriately determined in accordance with the structure of a brake system. For example, the initial reaction force F is about 20N in this embodiment. In this state, the spring bearing 40 is kept at an intermediate position, and the reaction force F is adjusted up and down within a range shown by the oblique lines in FIG. 5 by allowing the spring bearing 40 to move back and forth from the intermediate position. The reaction force F in FIG. 5 is a value obtained at the depression part 24 of the operation pedal 16.

Figure 6:
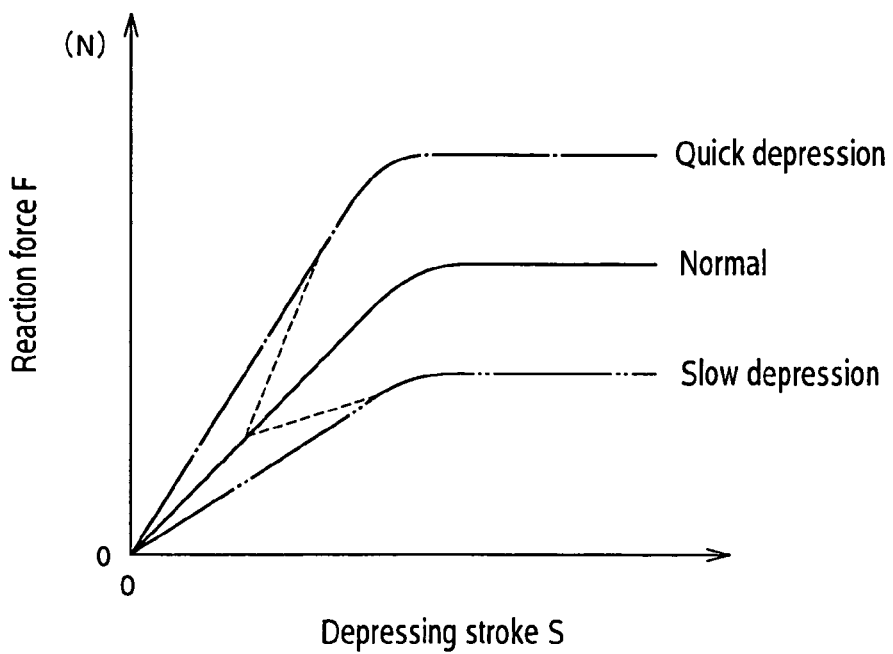
FIG. 6 is a graph explaining a response delay of a conventional reaction force adjuster in which reaction force characteristics are changed by changing the position of a spring bearing by use of an electric motor in accordance with a depressing speed without being provided with the damper device.

Since the reaction force adjuster 18 in this embodiment includes the damper device 26 that gives a reaction force based on the flow resistance of a fluid, the reaction force F mechanically varies in accordance with the depressing speed of a braking operation, and the reaction force F becomes greater when depressed quickly than when depressed slowly. In contrast, in a case in which reaction-force characteristics are changed by changing the position of the spring bearing in accordance with the depressing speed by use of the electric motor without being provided with the damper device as in Patent Document 2 mentioned above, and, if the initial position of the spring bearing is set so as to obtain the intermediate characteristics shown by the solid line of FIG. 6, the reaction force F is changed as shown by the dotted line of FIG. 6 because of a response delay even if the reaction force F is changed to have characteristics shown by the dash-single-dot line or by the dash-double-dot line when the depressing speed is high or low. Therefore, the reaction force becomes small or great at the beginning of the depressing operation, and it is not necessarily possible to obtain a good operational feeling.

Figure 7:
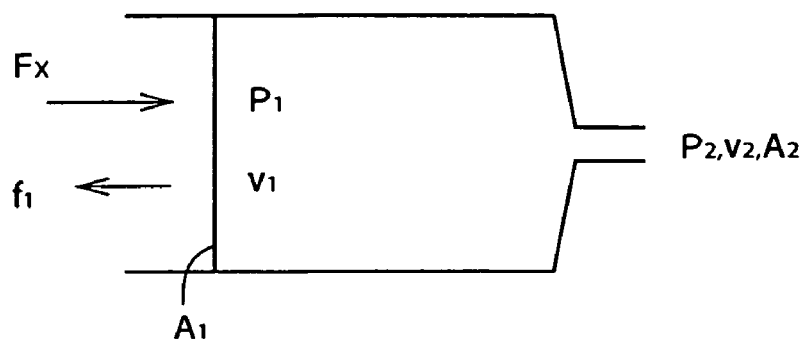
FIG. 7 is a reference view for explaining various parameters that are used to explain the reaction force of the damper device that varies in accordance with a depressing speed.

A detailed description will now be given of a reaction force obtained by the damper device 26 in accordance with a depressing speed with reference to a schematic view of FIG. 7. According to Bernoulli's theorem, Equation (1) and Equation (2) shown below are established, and Equation (3) is obtained from Equation (1) and Equation (2), where, as shown in FIG. 7, $v_1$ is the moving speed (corresponding to a pedal depressing speed) of the piston moved through the piston rod 38, $A_1$ is the sectional area of the piston, $P_1$ is pressure inside the damper, $v_2$ is the speed of a fluid flowing through the orifice, $A_2$ is the sectional area of the orifice, $P_2$ is pressure outside the damper, and $\rho$ is the density of the fluid. On the other hand, the reaction force F given by the reaction force adjuster 18 is obtained by the addition of a damper reaction force $f_1$ to a spring reaction force $f_2$ generated by the helical compression springs 28 and 29. The damper reaction force $f_1$ is expressed as Equation (4) shown below by use of the pressure $P_1$ and the sectional area $A_1$. The spring reaction force $f_2$ is expressed as Equation (5) shown below by use of the spring constant k and the movement stroke $S_T$ of the piston rod 38. Accordingly, the reaction force F is expressed as Equation (6). In FIG. 7, $F_X$ designates an input load that is input into the reaction force adjuster 18 through the piston rod 38 from the operation pedal 16. The input load is generated in accordance with the reaction force F.

[Formula 1]

$$(v_2^2 - v_1^2)/2 = (P_1 - P_2)/\rho \tag{1}$$

$$v_1 \times A_1 = v_2 \times A_2 \tag{2}$$

$$P_1 = [v_1^2 \times \rho \times \{(A_1/A_2)^2 - 1\}]/2 + P_2 \tag{3}$$

$$f_1 = P_1 \times A_1 \tag{4}$$

$$f_2 = k \times S_T \tag{5}$$

$$F = f_1 + f_2 = P_1 \times A_1 + k \times S_T \tag{6}$$

Since $\rho$, $A_1$, and $A_2$ do not vary in accordance with the depressing speed in Equation (3) shown above, $P_1$ depends on $v_1^2$. Additionally, since $S_T$ (i.e., initial movement stroke) $\cong 0$ in Equation (5), $f_2 \cong 0$. After all, the reaction force F at the beginning of a pedal depressing operation is changed depending on $v_1^2$, and depends on the depressing speed from Equations (3) and (6).

Referring again to FIG. 1, the braking force generator 22 is an oil brake or an electric brake used to generate a braking force in a wheel, and the braking force thereof is electrically controlled by the controller 20 for oil hydraulic control or motor torque control. A pair of load sensors 50 and 52 for detecting an operating force, that is, a depressing force $F_p$ with which the operation pedal 16 is depressed is disposed as operating force sensors on a load transmitting path between the operation pedal 16 and the reaction force adjuster 18. From these sensors, a signal indicating the depressing force $F_p$ is supplied to the controller 20. From a stroke sensor 54 disposed on the bracket 12, a signal indicating a depressing stroke S of the operation pedal 16, that is, the quantity of rotation around the axis center O is supplied to the controller 20. Both the depressing force $F_p$ and the depressing stroke S are operational information concerning a braking operation applied to the operation pedal 16. The load sensors 50 and 52 and the stroke sensor 54 are each equivalent to an operational information detecting device.

A signal indicating various environmental information concerning a driving environment is additionally supplied to the controller 20 from an environmental-information detecting device 56. The environmental information is various information other than the braking operation applied to the operation pedal 16, and includes information concerning road conditions, weather conditions, vehicular traveling speed conditions, and vehicle conditions in this embodiment. The road conditions are concerned with a mountain road (ascending), a mountain road (descending), winding, height above sea level, gravity, atmospheric pressure, road width, curve size, etc., which can be detected by, for example, a slope sensor, a yaw-rate sensor, a G (gravity acceleration) sensor, a barometer, a car-navigation system, etc. The road slope can also be detected, for example, from the output of a driving source and the traveling speed of a vehicle. The weather conditions are concerned with rain, snow, ice, frozen roads, temperature, humidity, lightness, wind direction, wind power, etc., which can be detected by a raindrop sensor, a thermometer, a hygrometer, an illumination meter, etc. The vehicular traveling speed conditions are concerned with high speed, low speed, traffic jam, etc., which can be judged, for example, from traveling speed and a change in the traveling speed. The vehicle conditions are concerned with collision, emergency, brake failure, etc., which can be detected by a distance sensor (e.g., radar), traveling speed, accelerator return speed, brake depressing speed, brake oil pressure sensor, etc. Besides, it is possible to detect the fatigue of a driver, based on the depressing speed or the depressing force $F_p$ of the operation pedal 16 and take this as environmental information.

Figure 8:
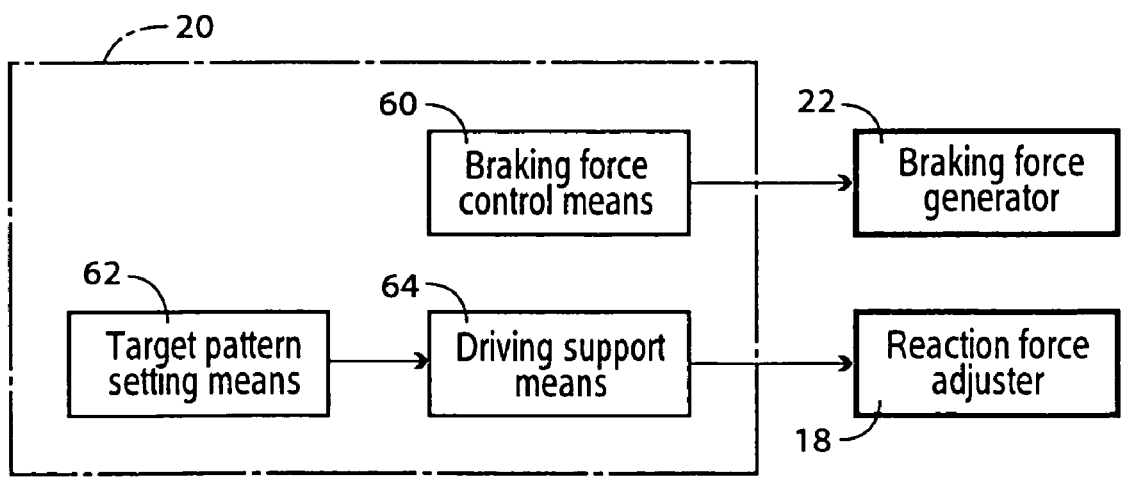
FIG. 8 is a block diagram for explaining a control system of the embodiment of FIG. 1.

The controller 20 is structured to include a microcomputer having CPUs, RAMs, ROMs, etc., and performs signal processing in accordance with a predetermined program, thus fulfilling the function of a braking force control means 60, the function of a target pattern setting means 62, and the function of a driving support means 64 shown in FIG. 8. The braking force control means 60 calculates workload D (=$F_p$×S) by multiplying the depressing force $F_p$ supplied from the load sensors 50 and 52 and the depressing stroke S supplied from the stroke sensor 54 together, and controls the braking force generator 22 so as to generate a predetermined braking force in accordance with the workload D. The target pattern setting means 62 and the driving support means 64 are used to apply a predetermined reaction force F to the operation pedal 16 during a braking operation so that the driver can perform an ideal braking operation by which the vehicle can be smoothly decelerated and stopped in various driving environments even if the driver is an inexperienced driver. The reaction force adjuster 18, more specifically, the electric motor 42 of the electric drive unit 46 is controlled by performing signal processing in accordance with the flowchart of FIG. 9. Among a series of signal processing steps of FIG. 8, a part where steps S1 and S2 are carried out is equivalent to the target pattern setting means, and a part where steps S4 to S6 are carried out is equivalent to the driving support means.

Figure 9:
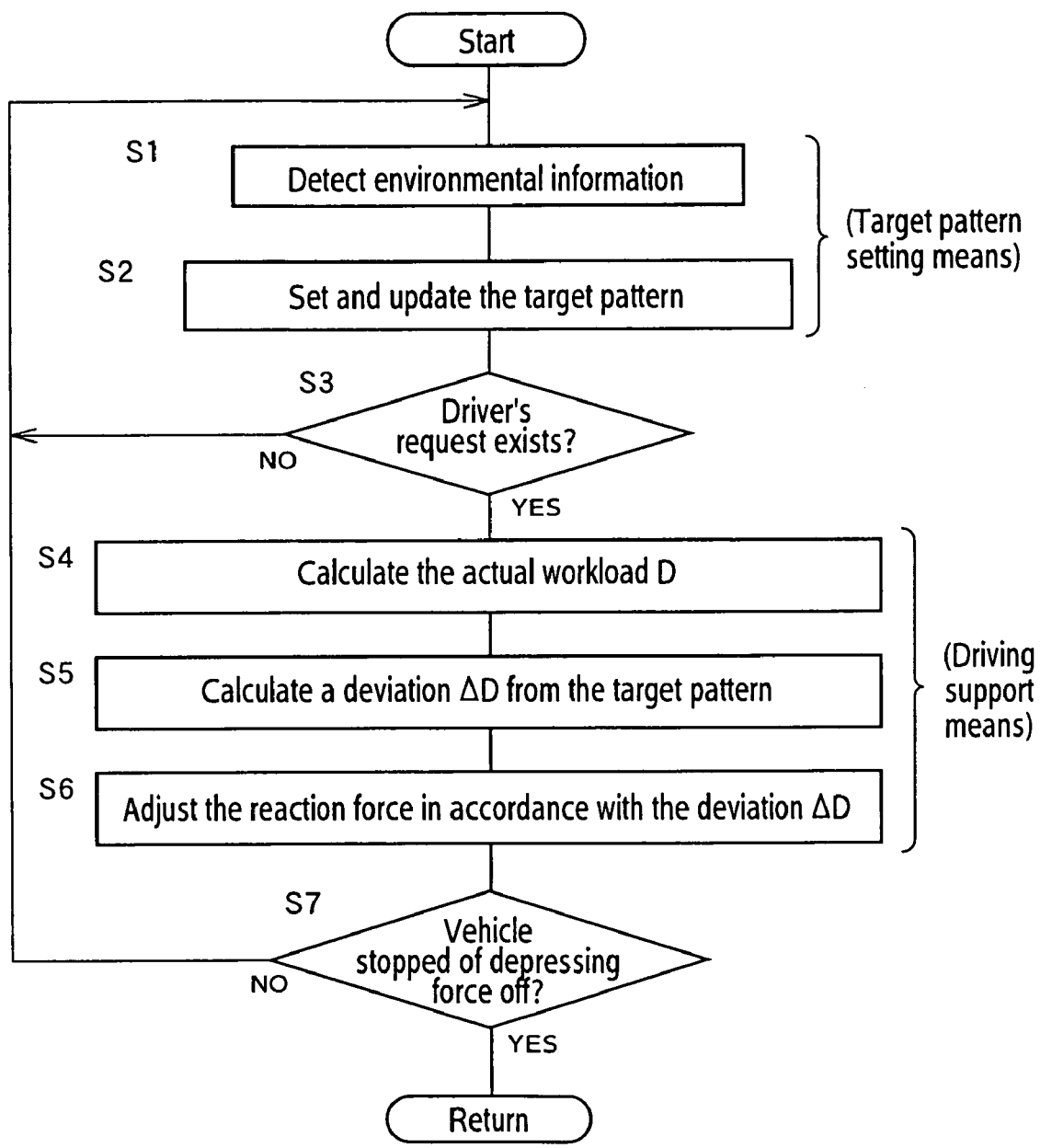
FIG. 9 is a flowchart for concretely explaining the braking operation support control that is carried out by a driving support means and a target pattern setting means of FIG. 8.
Figure 10:
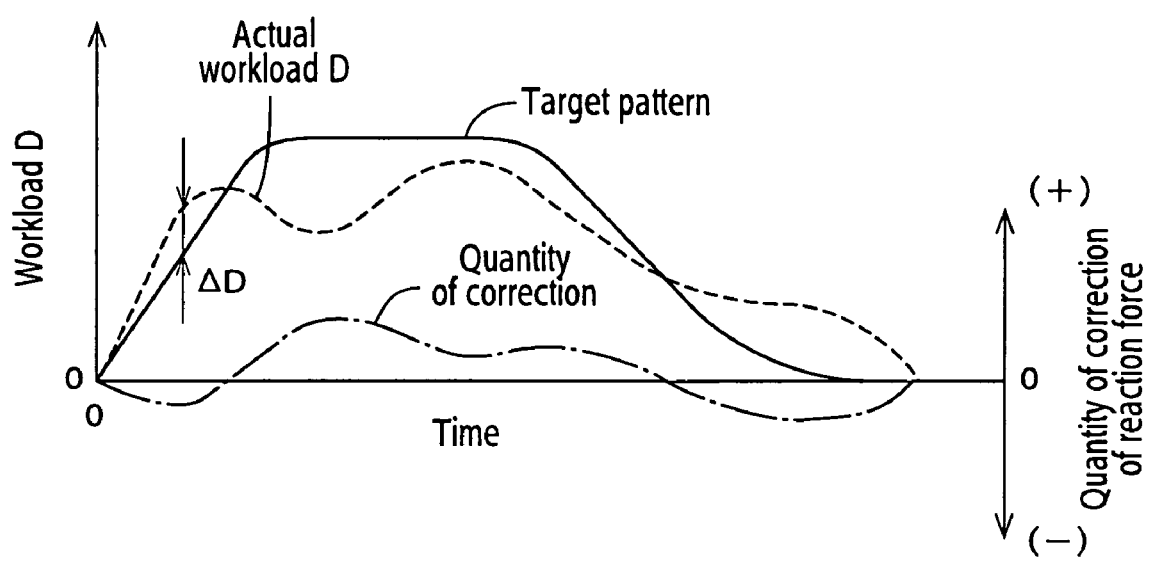
FIG. 10 is an example of a time chart showing the quantity of correction of a reaction force F controlled in accordance with the flowchart of FIG. 9 together with a target pattern.

In step S1 of FIG. 9, environmental information is taken from the environmental information detecting device 56, and, in step S2, for example, a target pattern shown by the solid line in FIG. 10 is set based on that environmental information, and is successively updated. With the workload D obtained by multiplying the depressing force $F_p$ and the depressing stroke S together as a parameter, the target pattern of FIG. 10 is determined so that an ideal braking operation, by which a vehicle can be smoothly decelerated and stopped, can be performed. In this embodiment, a reference target pattern that has been predetermined is appropriately corrected in accordance with environmental information as shown, for example, in FIG. 11. The depressing force $F_p$, the depressing stroke S, and the depressing acceleration given in the section of "input" in the table of FIG. 11 are those obtained by predicting the pedal operation of a driver in each environment, in which the oblique upward arrow denotes that those become greater than during normal traveling and in which the oblique downward arrow denotes that those become smaller than during normal traveling. Each arrow given in the horizontal section of "braking force" in the table has the same meaning, and indicates whether the braking force should be made greater or not than during normal traveling in each environment. The reaction force F and hysteresis correspond to the workload D of the target pattern, and are determined according to the aforementioned braking force as to whether to be made greater or smaller. The workload D is corrected according to a change in the reaction force F and in the hysteresis. The difference between the reaction force F and the hysteresis is as follows. The reaction force F is generated during a depressing operation, whereas the hysteresis is a difference of the reaction force F between that during the depressing operation and that during the return operation of the operation pedal 16. This denotes that the reaction force F during the return operation becomes smaller proportionately with an increase in the difference, and the return speed becomes lower.

Figure 12:
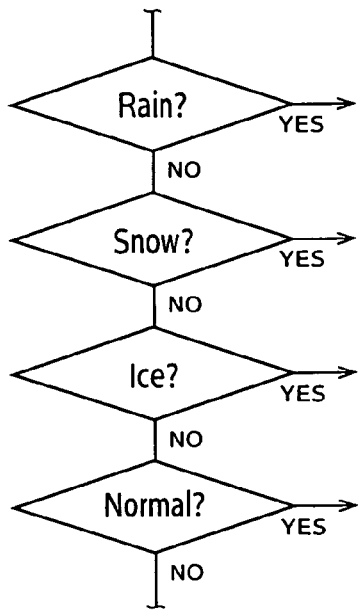
FIG. 12 is a flowchart that concretely shows a process part according to which a weather condition that is a piece of environmental information is judged in step S2 of FIG. 9.

FIG. 12 shows a processing part of environmental information concerning weather conditions, in which a determination is made as to whether the weather is rainy, snowy, icy, or ordinary weather other than these, and a target pattern is corrected in accordance with a correcting condition predetermined for each weather. Although corrections for the weather conditions are omitted in FIG. 11, the target pattern is corrected so that the vehicle does not spin when it is raining. The reaction force F is reduced so that the vehicle does not spin, or the wheel does not slip, and the driver does not become fatigued when the weather is snowy or icy.

Figure 13:
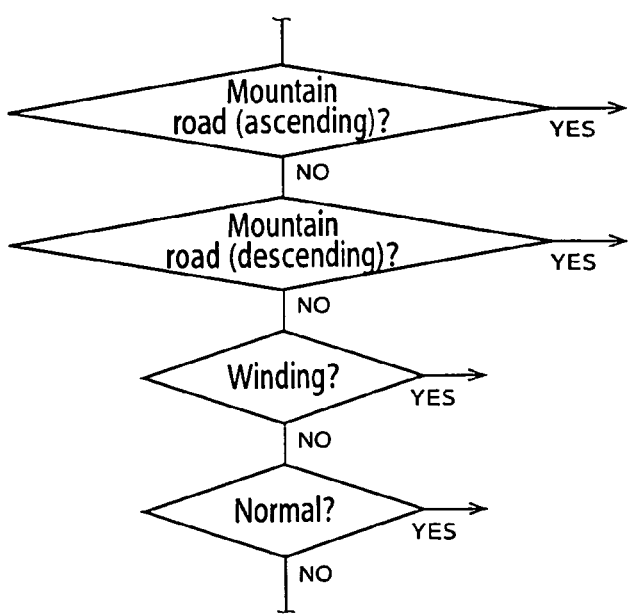
FIG. 13 is a flowchart that concretely shows a process part according to which a road condition that is a piece of environmental information is judged in step S2 of FIG. 9.

FIG. 13 shows a processing part of environmental information concerning road conditions, in which a determination is made as to whether the road is a mountain road (ascending), a mountain road (descending), a winding road, or a normal road, and the target pattern is corrected in accordance with a correcting condition predetermined for each road condition. For example, in ascending a mountain, in order to reliably decelerate the vehicle for a short distance, the reaction force is raised so as to improve a depressing feeling as shown in FIG. 11, whereas hysteresis is lowered so that the vehicle is ready to be accelerated at any time. In descending a mountain, the target pattern is made severer than in ascending although that is almost the same as in ascending. In traveling on a winding road (plain), the target pattern is made to have intermediate characteristics therebetween although that is almost the same as in ascending and in descending.

Figure 14:
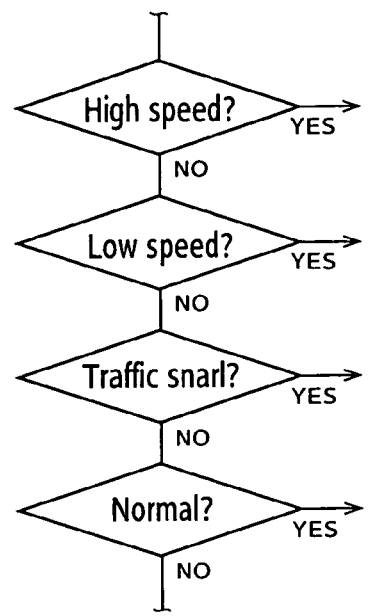
FIG. 14 is a flowchart that concretely shows a process part according to which a vehicular traveling speed condition that is a piece of environmental information is judged in step S2 of FIG. 9.

FIG. 14 shows a processing part of environmental information concerning vehicular traveling speed conditions, in which a determination is made as to whether the speed is high, low, delayed because of a traffic jam, or normal, and the target pattern is corrected in accordance with a correcting condition established for each speed condition. For example, in traveling at a high speed, the vehicle is required to be reliably decelerated for a short distance, and therefore the reaction force F is raised as shown in FIG. 11 so as to improve a depressing feeling. In traveling at a low speed, the vehicle is required to be stopped smoothly and slowly, and therefore the reaction force F is made lower so as to reduce burdens and fatigue of the driver. In a traffic jam, the vehicle is required to be stopped quickly and smoothly, and therefore hysteresis is enlarged so that a braking force is not completely released at once even when the foot is separated from the operation pedal 16, and the reaction force F is lowered so that the driver does not become fatigued.

Figure 15:
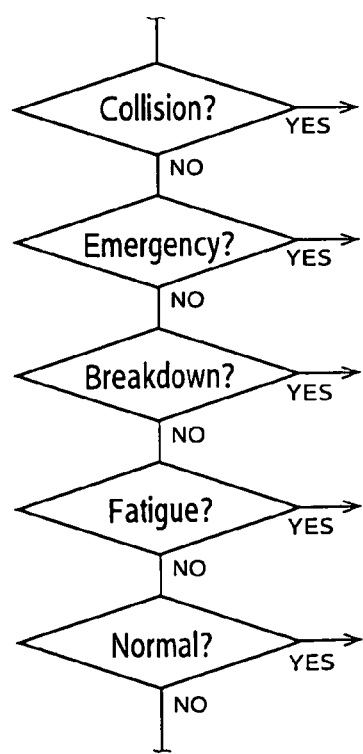
FIG. 15 is a flowchart that concretely shows a process part according to which a fatigue/vehicle condition that is a piece of environmental information is judged in step S2 of FIG. 9.

FIG. 15 shows a processing part of environmental information concerning vehicle conditions and concerning driver's fatigue, in which a determination is made as to whether the vehicle is in a collision, in an emergency, in a breakdown, in a state of being driven by a driver being fatigued, or in a normal state, and the target pattern is corrected in accordance with a correcting condition established for each vehicle condition or established based on whether the driver is fatigued or not. For example, in a collision, the vehicle is required to be reliably stopped with respect to all braking operations, and therefore hysteresis is enlarged as shown in FIG. 11 so that a braking force is not released at once even when the foot is separated from the operation pedal 16. In an emergency, the vehicle is required to be quickly decelerated and stopped for a short stopping distance, and therefore the reaction force F is reduced, and hysteresis is enlarged so that the vehicle can be reliably decelerated and stopped even if the driver is power less. In a breakdown, the vehicle is required to be quickly and reliably decelerated and stopped when electronic parts, such as sensors and motors, break down, and therefore the reaction force F is reduced, and hysteresis is enlarged. During driver's fatigue, the driver reacts slowly, and therefore the reaction force F is reduced, and hysteresis is enlarged so that the vehicle can be quickly stopped without imposing a burden on the driver.

Although the weather conditions, the road conditions, the vehicular traveling speed conditions and the vehicle conditions have been individually described in FIG. 12 to FIG. 15, the target pattern is duplicately corrected when these correspond to a plurality of correcting conditions, for example, when the driver is fatigued while the vehicle is ascending a mountain in rainy weather. However, it is permissible to set the upper and lower limits so that the target pattern is not extremely changed. Additionally, it is permissible to correct the target pattern at a plurality of stages depending on the degree (size) of each environmental information.

Referring again to FIG. 9, in step S3, based on a depressing force $F_p$ detected by the load sensor 50 or 52 or a depressing stroke S detected by the stroke sensor 54, a determination is made as to a braking request of the driver, that is, as to whether the operation pedal 16 has been depressed or not. If the braking request has not been made, step S1 and its following steps are repeatedly carried out, and the target pattern is sequentially updated in accordance with a change in the driving environment. On the other hand, if the braking request has been made, step S4 and its following steps are carried out, and the braking operation is supported by controlling the reaction force F so that an appropriate braking force can be obtained in accordance with the driving environment.

In step S4, the actual workload D is calculated by multiplying the depressing force $F_p$ detected by the load sensor 50 or 52 and the depressing stroke S detected by the stroke sensor 54 together. In step S5, a deviation $\Delta D$ is calculated by a comparison between the target pattern concerning the workload D set in step S3 and the actual workload D. In step S6, the reaction force F is adjusted by subjecting the electric motor 42 to feedback control in accordance with the magnitude of the deviation $\Delta D$ so that the deviation $\Delta D$ becomes zero (0) and by moving the spring bearing 40. FIG. 10 is a time chart for explaining an example of such feedback control, in which the solid line designates the target pattern, the broken line designates the actual workload D, and the dash-single-dot line designates the quantity of correction of the reaction force F. If the actual workload D is greater than the target pattern, the electric motor 42 is driven so that the reaction force F becomes smaller in accordance with the magnitude of the deviation $\Delta D$. If the actual workload D is smaller than the target pattern, the electric motor 42 is driven so that the reaction force F becomes greater in accordance with the magnitude of the deviation $\Delta D$. As a result, the braking operation is performed so that the workload D of the pedal operation of the driver varies in accordance with the target pattern. In other words, the operation pedal 16 can be easily depressed when the reaction force F becomes small, and the operation pedal 16 cannot be easily depressed when the reaction force F becomes great, and therefore this makes it possible to perform the braking operation so that the workload D of the pedal operation varies in accordance with the target pattern.

In step S7 subsequent thereto, a determination is made as to whether the vehicle has been stopped or whether the depressing operation of the operation pedal 16 has been released. If the vehicle has been stopped or the depressing operation has been released, a series of driving support control operations are ended. However, if the vehicle is traveling and the operation pedal 16 is still being depressed, step S1 and its following steps are repeatedly carried out, and the reaction force F is controlled by feedback control so that the actual workload D varies in accordance with the target pattern while the target pattern is sequentially updated in accordance with the driving environment.

Figure 16:
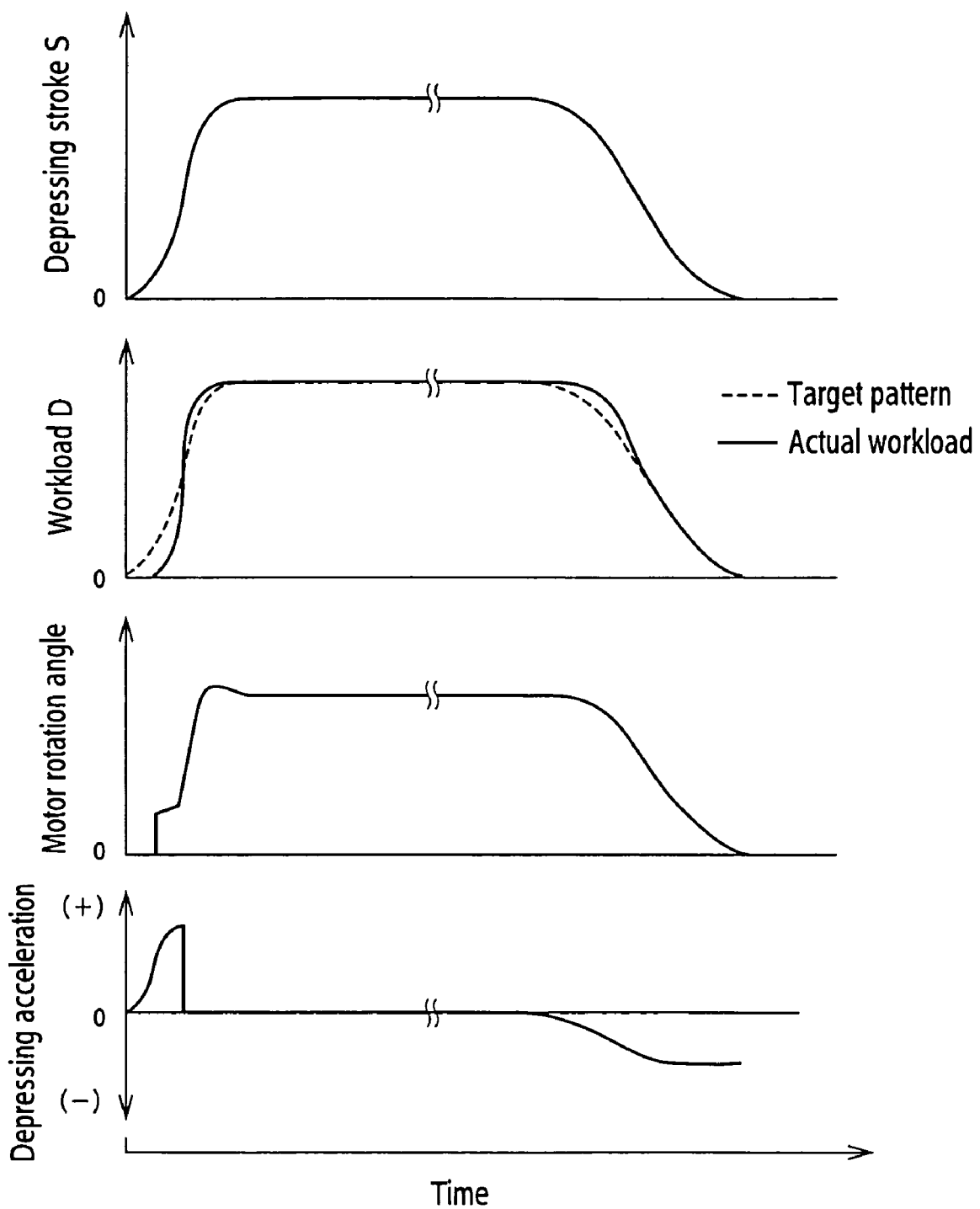
FIG. 16 is an example of a time chart showing a change of each part that occurs in a case in which the braking operation support control is performed in accordance with the flowchart of FIG. 9 when the depressing speed of the operation pedal is high.
Figure 17:
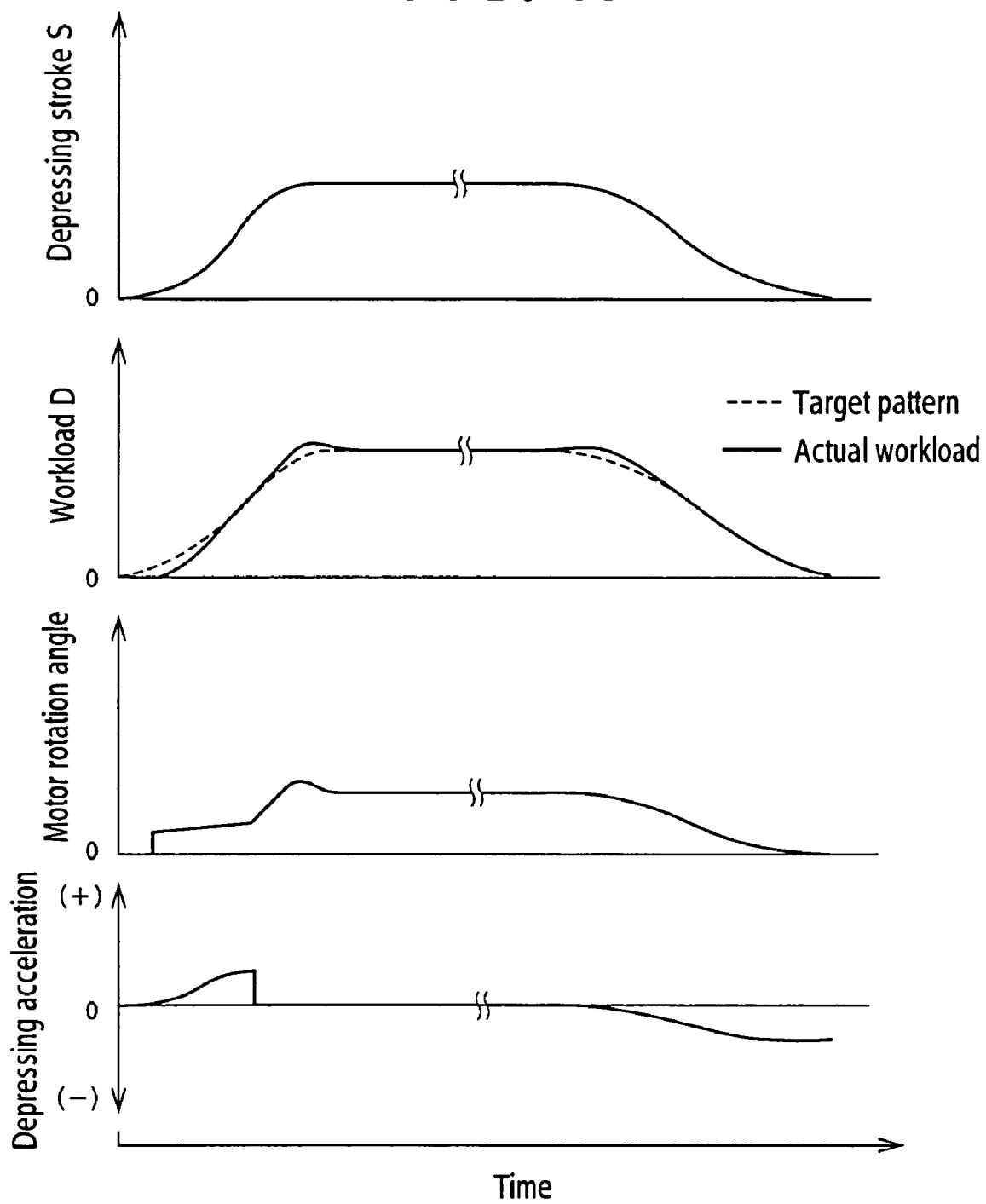
FIG. 17 is an example of a time chart showing a change of each part that occurs in a case in which the braking operation support control is performed in accordance with the flowchart of FIG. 9 when the depressing speed of the operation pedal is low.

Accordingly, it becomes possible even for an inexperienced driver who might depress the operation pedal 16 twice because of a long braking distance, bring about irregularity in the depressing force $F_p$ and in the depressing speed, or reaccelerate the vehicle because of a short braking distance to easily perform an ideal braking operation by which the vehicle is smoothly decelerated and stopped. FIG. 16 shows an example of a time chart that shows a change in each part in a case in which a driving support control operation is performed in accordance with the flowchart of FIG. 9 when the depressing speed is high, and FIG. 17 shows an example of a time chart that shows a change in each part in a case in which a driving support control operation is performed in accordance with the flowchart of FIG. 9 when the depressing speed is low.

Thus, in the brake operating apparatus 10 in this embodiment, operational information concerning the braking operation of a driver (depressing force $F_p$ and depressing stroke S) and environmental information concerning the driving environment of a vehicle (weather conditions, road conditions, vehicular traveling speed conditions, and vehicle conditions) are detected, and a target pattern concerning the braking operation is set based on the environmental information, and the reaction force F of the reaction force adjuster 18 is controlled so that the braking operation can be performed in accordance with that target pattern. Therefore, in various driving environments, the braking operation can be easily performed in accordance with the target pattern, and an ideal braking force corresponding to the target pattern is performed in accordance with that braking operation, so that a good driving feeling can always be obtained.

The reaction force adjuster 18 includes the damper device 26 that gives a reaction force based on the flow resistance of a fluid and the helical compression springs 28 and 29 that give a reaction force based on elastic deformation. The reaction force F is mechanically given by the damper device 26 and the helical compression springs 28 and 29. The reaction force by the damper device 26 depends on the depressing speed of the braking operation. When the pedal is depressed quickly, a reaction force F greater than when the pedal is depressed slowly is mechanically given, and hysteresis in which the reaction force F differs between that during a depressing operation and that during a return operation is mechanically given. Therefore, reaction force characteristics similar to those of a conventional mechanical brake operating apparatus can be easily obtained even when a depressing speed is different in each depressing operation or when a return operation is performed.

Additionally, the reaction force adjuster 18 adjusts a reaction force generated based on the elastic deformation of the helical compression spring 28 by electrically moving the position of the spring bearing 40 of the helical compression spring 28 by means of the electric drive unit 46. Therefore, the reaction force F can be finely controlled so that a braking operation can be performed in accordance with a target pattern that is set in accordance with various driving environments, and a more appropriate reaction force F than that of a conventional mechanical brake operating apparatus can be obtained, so that the braking operation is facilitated.

Additionally, a depressing force $F_p$ and a depressing stroke S are detected by the load sensors 50 and 52 and the stroke sensor 54. A target pattern is set with the workload D as a predefined parameter obtained from the depressing force $F_p$ and the depressing stroke S. The braking force control means 60 controls a braking force in accordance with the workload D. Therefore, the braking operation is performed so that the workload D varies in accordance with the target pattern by controlling the reaction force F, and, accordingly, an ideal braking force control operation corresponding to the target pattern can be performed, and a driver can easily perform such an ideal braking operation.

Additionally, since the pair of load sensors 50 and 52 are provided as operating force sensors in this embodiment, a normal brake control operation can be performed by use of one of the load sensors even if the other load sensor breaks down, and a brake control operation can be performed based on a depressing stroke S detected by the stroke sensor 54 even if both of the load sensors break down. As a result, a high fail safe function can be obtained.

FIG. 18 is a table showing whether the reaction force F, the hysteresis, and the brake can be controlled or not ("○" denotes "possible", and "x" denotes "impossible") when a breakdown "x" occurs in the electric motor 42, the damper device 26, the load sensors 50 and 52, and the stroke sensor 54. As shown in the lowest horizontal section of the table, the brake can be controlled except when all of the three sensors 50, 52, and 54 break down. "*1" in the table denotes that a minimum reaction force F can be secured by the pair of helical compression springs 28 and 29 although the reaction force F cannot be adjusted because of the breakdown of the electric motor 42. "*2" in the table denotes that the brake can be controlled by regarding the operation pedal 16 as being depressed at a point where a detection value of the stroke sensor 54 exceeds a specified level even when both of the load sensors 50 and 52 break down.

Besides, the motor torque (current value) of the electric motor 42, the detection value of the depressing force $F_p$, and the detection value of the depressing stroke S are always monitored in order to check the breakdown of the electric motor 42 and the sensors 50, 52, and 54. Additionally, a pressure sensor that detects the internal pressure of the damper device 26 may be provided to detect a depressing speed from the internal pressure, so that the abnormality of the other sensors can be judged, and the depressing speed calculated from the depressing stroke S can be corrected.

On the other hand, when the breakdown of an electric system causes a runaway of the electric motor 42, and, as a result, the spring bearing 40 moves rightward in FIG. 1 so as to compress the helical compression spring 28, a stopper mechanically works by means of a mechanism provided in the damper device 26, so that a detecting operation and a brake control operation can be performed with ease without allowing a rise in the detection value (depressing force $F_p$) of the load sensors 50 and 52. However, the reaction force F is increased. Although the motor torque (motor electric current) of the electric motor 42 is detected, the motor can be regarded as being in a runaway state when the detection value of the depressing force $F_p$ is zero (0), and the detection value of the depressing stroke S is zero (0).

When the spring bearing 40 moves leftward in FIG. 1 because of the runaway of the electric motor 42, and, in response to this movement, the helical compression spring 28 and the piston rod 38 are pulled leftward, the motor torque (motor electric current) and the detection value of the depressing stroke S show predefined values, but the motor can be regarded as being in a runaway state since the detection value of the depressing force $F_p$ is zero (0). In this case, the brake can be controlled based on the detection value of the depressing force $F_p$.

Although the reaction force adjuster 18 is disposed closer to the front of the vehicle than the operation pedal 16 in the aforementioned embodiment, the reaction force adjuster may be disposed closer to the rear of the vehicle than the operation pedal 16 or may be disposed above the operation pedal 16. Alternatively, the reaction force adjuster 18 may be vertically disposed in the same way as reaction force adjusters 70 and 72 shown in FIG. 19 and FIG. 20. In FIG. 19 and FIG. 20, the same reference character is given to a part that performs the same function as in the aforementioned embodiment, and a detailed description thereof is omitted.

Although the embodiments of the present invention have been described in detail as above with reference to the drawings, the present invention is not limited to these embodiments, and can be embodied in variously modified or improved aspects based on the knowledge of persons skilled in the art.

What is claimed is:

1. An electric operating apparatus for a vehicle, comprising:
    an operational member operated in accordance with an electrically-controlled traveling request or an electrically-controlled braking request of a driver;
    a reaction force adjuster that can electrically adjust a reaction force applied to the operational member;
    an operational information detecting device for detecting operational information concerning a requested operation applied to the operational member by the driver;
    an environmental information detecting device for detecting environmental information concerning a driving environment of the vehicle;
    a target pattern setting means for setting a target pattern determined as a variable pattern of the operational information and concerning the requested operation of the operational member based on the environmental information; and
    a driving support means for controlling the reaction force adjusted by the reaction force adjuster based on the operational information detected by the operational information detecting device so that the requested operation of the operational member is performed in accordance with the target pattern.

2. The electric operating apparatus for a vehicle according to claim 1, wherein the operational member is a brake operating member, and the requested operation is a braking operation applied to the brake operating member.

3. The electric operating apparatus for a vehicle according to claim 2, wherein the reaction force adjuster comprises:
    a damper device that gives the reaction force based on flow resistance of a fluid by being mechanically compressed or pulled in response to the braking operation;
    a spring member that gives the reaction force based on elastic deformation by being mechanically subjected to the elastic deformation in response to the braking operation; and
    an electric drive unit that adjusts the reaction force generated based on the elastic deformation of the spring member by electrically moving a position of a spring bearing of the spring member.

4. The electric operating apparatus for a vehicle according to claim 3, wherein the operational information detecting device comprises:
    an operating force sensor that detects an operating force applied to the brake operating member, and
    a stroke sensor that detects an operation stroke of the brake operating member,
    wherein the target pattern setting means sets the target pattern by use of a predetermined parameter obtained from the operating force and the operation stroke, and
    the driving support means controls the reaction force so that the predetermined parameter varies in accordance with the target pattern.

5. The electric operating apparatus for a vehicle according to claim 4, further comprising two operating force sensors.

6. The electric operating apparatus for a vehicle according to claim 5, wherein the environmental information detected by the environmental information detecting device contains at least one item of information selected from the group consisting of road conditions, weather conditions, vehicular traveling speed conditions, and vehicle conditions, and the target pattern is set by the target pattern setting means based on the item of information.

7. The electric operating apparatus for a vehicle according to claim 4, wherein the environmental information detected by the environmental information detecting device contains at least one item of information selected from the group consisting of road conditions, weather conditions, vehicular traveling speed conditions, and vehicle conditions, and the target pattern is set by the target pattern setting means based on the item of information.

8. The electric operating apparatus for a vehicle according to claim 3, wherein the environmental information detected by the environmental information detecting device contains at least one item of information selected from the group consisting of road conditions, weather conditions, vehicular traveling speed conditions, and vehicle conditions, and the target pattern is set by the target pattern setting means based on the item of information.

9. The electric operating apparatus for a vehicle according to claim 2, wherein the operational information detecting device comprises:
   an operating force sensor that detects an operating force applied to the brake operating member, and
   a stroke sensor that detects an operation stroke of the brake operating member,
   wherein the target pattern setting means sets the target pattern by use of a predetermined parameter obtained from the operating force and the operation stroke, and
   the driving support means controls the reaction force so that the predetermined parameter varies in accordance with the target pattern.

10. The electric operating apparatus for a vehicle according to claim 9, further comprising two operating force sensors.

11. The electric operating apparatus for a vehicle according to claim 10, wherein the environmental information detected by the environmental information detecting device contains at least one item of information selected from the group consisting of road conditions, weather conditions, vehicular traveling speed conditions, and vehicle conditions, and the target pattern is set by the target pattern setting means based on the item of information.

12. The electric operating apparatus for a vehicle according to claim 9, wherein the environmental information detected by the environmental information detecting device contains at least one item of information selected from the group consisting of road conditions, weather conditions, vehicular traveling speed conditions, and vehicle conditions, and the target pattern is set by the target pattern setting means based on the item of information.

13. The electric operating apparatus for a vehicle according to claim 2, wherein the environmental information detected by the environmental information detecting device contains at least one item of information selected from the group consisting of road conditions, weather conditions, vehicular traveling speed conditions, and vehicle conditions, and the target pattern is set by the target pattern setting means based on the item of information.

14. The electric operating apparatus for a vehicle according to claim 1, wherein the environmental information detected by the environmental information detecting device contains at least one item of information selected from the group consisting of road conditions, weather conditions, vehicular traveling speed conditions, and vehicle conditions, and the target pattern is set by the target pattern setting means based on the item of information.

* * * * *